Oct. 15, 1940.                F. A. HASSMAN                2,218,469
OVERARM ACTUATING MECHANISM
Filed July 3, 1939
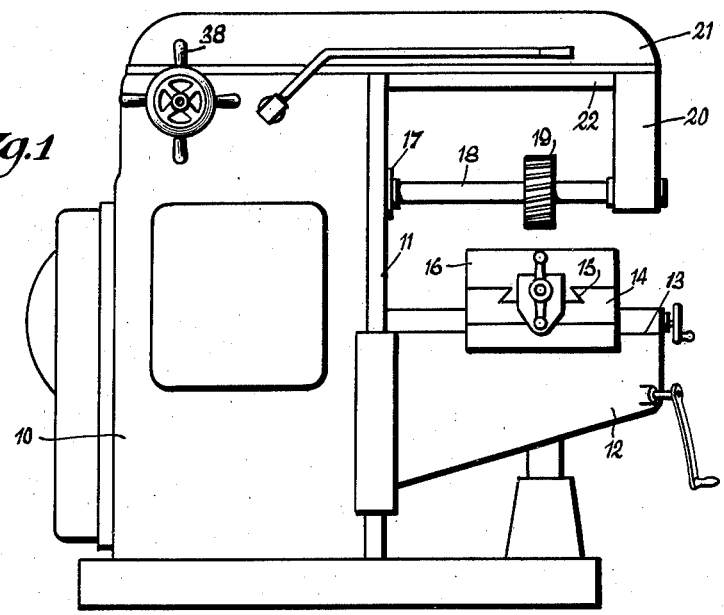
Fig. 1
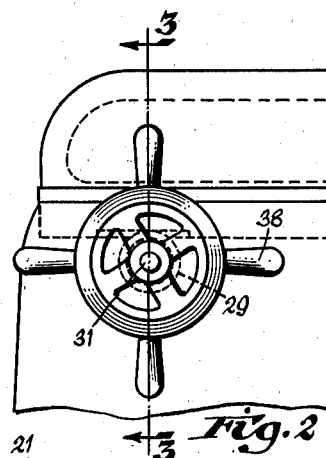
Fig. 2
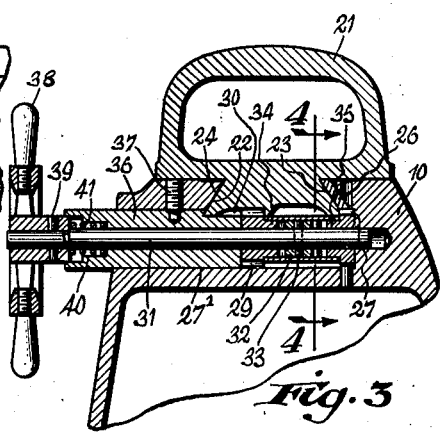
Fig. 3
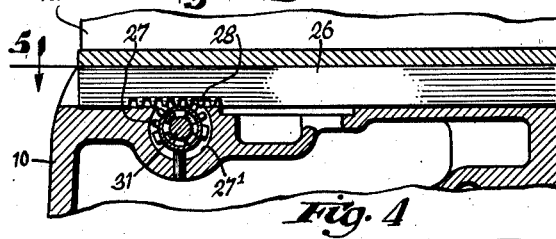
Fig. 4
Fig. 5
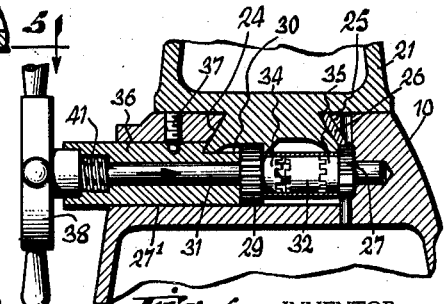
Fig. 6
INVENTOR.
FRED A. HASSMAN
BY H. K. Parsons
ATTORNEY.

Patented Oct. 15, 1940

2,218,469

UNITED STATES PATENT OFFICE 2,218,469

OVERARM ACTUATING MECHANISM

Fred A. Hassman, Cincinnati, Ohio, assignor to The Cincinnati Milling Machine Co., Cincinnati, Ohio, a corporation of Ohio Application July 3, 1939, Serial No. 282,652

7 Claims. (Cl. 90—20.5)

This invention relates to machine tools and more particularly to improvements in milling machines.

One of the objects of this invention is to provide an improved overarm structure for milling machines.

A more specific object of this invention is to provide improved mechanism for shifting and clamping the overarm support for milling machine spindles.

Other objects and advantages of the present invention should be readily apparent by reference to the following specification, considered in conjunction with the accompanying drawing forming a part thereof and it is to be understood that any modifications may be made in the exact structural details there shown and described, within the scope of the appended claims, without departing from or exceeding the spirit of the invention.

Referring to the drawing in which like reference numerals indicate like or similar parts:

Figure 1 is a side elevation of a milling machine embodying the principles of this invention.

Figure 2 is an elevational view partly in section showing the actuating means for the overarm.

Figure 3 is a section on the line 3—3 of Figure 2.

Figure 4 is a section on the line 4—4 of Figure 3.

Figure 5 is a section on the line 5—5 of Figure 4.

Figure 6 is a section similar to Figure 3 with the clutch in shifted position for actuation of the overarm clamp.

In Figure 1 of the drawing there is illustrated a knee and column type milling machine to which this invention is particularly adaptable and therefore will be described in connection therewith.

The reference numeral 10 indicates the column of the machine upon the front face of which is formed a vertical guideway 11 for receiving and guiding a vertically movable knee 12. The knee is provided with horizontal guide surfaces 13 for a crosswise moving saddle 14; and the saddle, in turn, is provided with a dovetailed guideway 15 on which reciprocates a work supporting table 16. This machine has a power driven spindle 17 for rotating an arbor 18 upon which is keyed a milling cutter or tool 19.

Means are provided for supporting the outboard end of the arbor comprising a pendant 20 and an overarm 21. The underside of the overarm is provided with dovetailed guide surfaces 22 and 23 which extend parallel to the axis of the cutter arbor and these guide surfaces are utilized for guiding the overarm for adjusting movement relative to the column, and for movement of the pendant 20 relative to the overarm.

This invention deals with a simplified mechanism for adjusting the overarm relative to the column, and for clamping the overarm to the column.

Referring to Figure 3, the top of the column is provided with a dovetailed guideway, one guide surface 24 of which extends parallel to the axis of the cutter spindle, and the other guide surface 25 of which, as shown in Figure 5, is non-parallel with the axis of the spindle, it being sufficiently spaced from the first guide to provide clearance for a tapered gib 26 which is utilized to frictionally clamp the overarm against the surface 24, thereby insuring that the overarm is clamped in such a position that its guide surfaces 22 and 23 extend parallel to the cutter axis and thereby provide an accurate guide for the pendant 20.

The upper portion of the column 10 is provided with a bore 27' in which is mounted actuating mechanism for effecting selective operation of the overarm, or of the clamping mechanism. This bore intersects the bottom of the dovetailed guideway formed in the top of a column, and has mounted therein a pinion 27 which intermeshes with rack teeth 28 formed on the bottom of the gib 26, as more particularly shown in Figure 4, and a second pinion 29 which intermeshes with rack teeth 30 formed on the underside of the overarm as more particularly shown in Figure 2.

The pinions 29 and 27 are supported for free rotation on a shaft 31 which has a clutch member 32 secured to it between the pinions as by a tapered pin 33. The opposing ends of the pinions are provided with clutch teeth 34 and 35 for selective engagement by clutch teeth formed on opposite ends of the clutch member 32.

The end of the bore 27' is closed by a sleeve 36 which serves to hold the parts in position and support the shaft 31 for rotation. The sleeve is held in position by a set screw 37.

The outer end of the shaft 31 has a hand wheel 38 secured thereto as by a tapered pin 39 and this hand wheel serves for rotating the shaft as well as for shifting it axially for selective positioning of the clutch. The end of the sleeve 36 is counterbored at 40 to provide for a spring 41 located therein for continuously urging the shaft 31 in a direction to normally maintain engagement of the clutch 32 with the clutch teeth 34 of the overarm actuating pinion 39. Thus, normal rotation of the hand wheel will effect actuation of the overarm, whereas it is necessary to push in on the hand wheel and then rotate it to actuate the gib 26.

In operation, the operator effects engagement of the clutch 32 with the gib operating pinion 27 and then rotates the hand wheel to unlock the gib. By releasing the hand wheel the clutch automatically shifts into engagement with the pinion 29 whereby the hand wheel is rotated to effect the necessary or desired adjustment of the overarm.

The first operation is then repeated with the exception that the pinion 27 is rotated in the opposite direction to clamp the gib.

It will thus be apparent that a new, improved and simplified mechanism has been provided for adjusting and clamping the overarm of a milling machine.

What is claimed is:

1. In a milling machine having a column, a cutter spindle journaled in the column and an overarm mounted on the top of the column for adjustment parallel to the axis of the spindle, said column having a guideway formed therein for receiving said overarm, the combination of a tapered gib supported in said guideway between one side of the overarm and the column, rack and pinion means for shifting said gib, a second rack and pinion means for shifting said overarm, an operating hand wheel and clutch means for operatively connecting said hand wheel for selective actuation of the respective rack and pinion mechanisms.

2. In a milling machine having a column, a cutter spindle journaled in said column and an overarm mounted on top of said column, the combination of means for shifting and clamping said overarm, said column having a depressed guideway formed in the top thereof for receiving said overarm, a tapered gib mounted in said guideway between one side of said overarm and the column, an operating mechanism for shifting the gib terminating in a first clutch member, an operating mechanism for shifting the overarm and terminating in a second clutch member, an operating hand wheel, a clutch operatively fixed with said hand wheel for axial shifting or rotation thereby, and means normally maintaining said clutch in engagement with the last-named clutch member.

3. In a milling machine having a column, a cutter spindle supported in said column, an overarm mounted on top of the column for supporting the outboard end of a cutter arbor driven by the spindle, the combination with a guideway formed in the column for receiving said overarm, a tapered gib slidably mounted in said guideway for movement parallel to the movement of said overarm for clamping the overarm to the column, mechanical means for translating the overarm, additional mechanical means for shifting said gib, a hand wheel rotatively supported by the column, and means for selectively connecting the hand wheel for operation of the respective mechanical means.

4. In a milling machine having a column, a cutter spindle supported in said column, an overarm mounted on top of the column for supporting the outboard end of a cutter arbor driven by the spindle, the combination with guideway means formed in the column for receiving said overarm, of a tapered gib mounted in said guideway means and movable axially thereof for clamping and unclamping the overarm, of rack and pinion means for actuating the gib, additional rack and pinion means for actuating the overarm, a hand wheel rotatably supported by the column, and means for selectively connecting the hand wheel with the respective rack and pinion means for sole actuation of either the gib or the overarm.

5. In a milling machine having a column, a cutter spindle supported in said column and an overarm mounted on top of the column for supporting the outboard end of a cutter arbor driven by said spindle, the combination with a dovetailed guideway for said overarm, of a tapered gib extending longitudinally of said guideway and movable relative thereto for clamping and unclamping the overarm with respect to the column, rack and pinion means for actuating the gib, additional rack and pinion means for actuating the overarm, each of said pinions having clutch teeth integrally formed therewith, a hand wheel rotatably supported by the column, a clutch member integral with the hand wheel and alternately shiftable into engagement with the clutch teeth of the respective pinions, and means normally maintaining engagement of the clutch member with the clutch teeth of one of said pinions.

6. In a milling machine having a column, an overarm mounted on the column, and means for clamping the overarm to the column, the combination of a first mechanical means for bodily shifting the overarm including a clutch pinion, a second mechanical means for operating the clamping means including a second clutch pinion, a manually operable member supported by the column, a clutch member integral with said member and interposed between the respective clutch pinions, and means normally maintaining the clutch in engagement with the clutch pinion which operates the overarm.

7. In a milling machine having a column, a cutter spindle supported in said column, an overarm mounted on top of the column for supporting the outboard end of a cutter arbor driven by the spindle, the combination with guideway means for the overarm, of a longitudinally shiftable tapered gib for clamping the overarm to the column, mechanical means for bodily shifting the overarm including an actuating member having clutch teeth formed thereon, a shiftable clutch member engaging said teeth, a shaft integrally connected to said clutch member, a manually operable hand wheel fixed to said shaft, mechanical means for shifting said gib including a second pinion having clutch teeth formed thereon and positioned for engagement by said clutch member, and means normally maintaining the clutch member in operative engagement with the first-named pinion whereby axial and rotatable pressure must be simultaneously applied to said shaft to effect actuation of said gib.

FRED A. HASSMAN.